(12) United States Patent
Kondilis et al.

(10) Patent No.: US 6,360,099 B1
(45) Date of Patent: Mar. 19, 2002

(54) REDUCING AUDIO GAPS DURING A COMMUNICATION NETWORK HANDOFF

(75) Inventors: Christos Kondilis, Evanston; Andrew Chu, Bartlett, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/591,166

(22) Filed: Jun. 9, 2000

(51) Int. Cl.$^7$ .................................................. H04Q 7/20
(52) U.S. Cl. ...................................... 455/436; 455/439
(58) Field of Search .............................. 455/436, 439, 455/442, 440, 441, 444, 437, 445; 379/111, 88.22

(56) References Cited

U.S. PATENT DOCUMENTS

| | | | | |
|---|---|---|---|---|
| 5,323,446 A | * | 6/1994 | Kojima et al. | 455/442 |
| 5,386,456 A | * | 1/1995 | Schatz et al. | 455/436 |
| 5,471,644 A | * | 11/1995 | Schatz et al. | 455/436 |
| 5,561,844 A | * | 10/1996 | Yayapalan et al. | 455/442 |
| 5,722,074 A | * | 2/1998 | Muszynski | 455/442 |
| 5,884,177 A | * | 3/1999 | Hanley | 455/439 |
| 6,148,206 A | * | 11/2000 | Karanja et al. | 455/436 |

FOREIGN PATENT DOCUMENTS

WO        WO-98/09454        *  8/1997  ............ H04Q/7/22

* cited by examiner

*Primary Examiner*—Nay Maung
*Assistant Examiner*—Sonny Trinh
(74) *Attorney, Agent, or Firm*—Jeffrey K. Jacobs

(57) ABSTRACT

A method of reducing an audio gap in a connection between communication hardware and a mobile unit during a handoff between a first cell and a second cell in a communication network, wherein a first voice processor is communicatively coupled to a mobile switching center that services the first cell, is disclosed. The method includes the steps of determining when the mobile unit is likely to move from the first cell to the second cell, establishing inbound and outbound communicative coupling between the mobile switching center and a second voice processor that services the second cell when the mobile unit is likely to move from the first cell to the second cell and determining that the mobile unit has moved from the first cell to the second cell.

18 Claims, 6 Drawing Sheets

REDUCING AUDIO GAPS DURING A COMMUNICATION NETWORK HANDOFF

FIELD OF THE INVENTION

The present invention relates generally to a method and apparatus for use in a communication network and, in particular, to a method and apparatus for reducing audio gaps during a handoff in a communication network.

BACKGROUND OF THE INVENTION

Digital or analog communication networks such as cellular or personal communication services (PCS) networks include infrastructure hardware that produces cells of coverage in which communication services are provided. A number of cells may overlap or abut one another to provide coverage over a significant geographical area. A user located within a cell may have access to the communications network via a mobile unit, such as a hand held portable telephone or a car telephone or the like. The mobile unit may communicate with the communication network using predetermined frequencies or digital codes associated with a particular cell with which the mobile unit is communicating. The communication network may be coupled to a conventional public switched telephone network (PSTN) to enable land line users (i.e., conventional terrestrial telephone users) to exchange information with mobile unit users.

As a user operating a mobile unit moves from one cell (e.g., a source cell) to another cell (e.g., a target cell), communication handoffs occur within both the infrastructure hardware and the mobile unit. During such a handoff, the mobile unit disconnects from the infrastructure hardware at the source cell and connects to the infrastructure hardware at the target cell. In the process of disconnecting and connecting the mobile unit may perform frequency tuning or may change digital codes to enable communication with the infrastructure at the target cell. While the mobile unit disconnects from the source cell and connects to the target cell, the infrastructure hardware at the source cell prepares to end communications with the mobile unit and the infrastructure hardware at the target cell prepares to begin communicating with the mobile unit. The timing at which the handoffs in the mobile unit and the infrastructure occur may lead to audio gaps in inbound audio (i.e., audio from the mobile unit to the infrastructure) and outbound audio (i.e., audio from the infrastructure to the mobile unit).

A portion of a prior art communication network 10 in the process of a handoff is shown in FIG. 1. The communication network 10, which may be a cellular network, includes a number of base transceiver stations (BTS's) (only two of which are shown) 14, 16, each of which provides a cell of coverage 18, 20, respectively. Each BTS 14, 16 is selectively interfaced to a base site controller (BSC) 22, which is further interfaced to a mobile switching center (MSC) 23. The MSC 23 communicatively couples the BSC 22 to a PSTN 24.

Each base site controller (e.g., the BSC 22) may provide communication service to one or more BTS's 14, 16. The BSC 22 may include one or more transcoders or voice processors 26, 28 that process communication information that is exchanged between the MSC 23 and a mobile unit 36, which may be disposed within one of the cells (e.g., the cell 18). Each of the voice processors 26, 28 may have an associated switch 30, 32, which may be controlled by a central processing unit (CPU) 34. The voice processors 26, 28 are selectively interfaced to the MSC 23 by the switches 30, 32. The BSC 22 may provide message transfer and call switching functionality and may be controlled by the MSC 23, via the CPU 34.

As shown in FIG. 1, the mobile unit 36 is near the interface of the cell 18 and the cell 20. While the mobile unit 36 is within the cell 18, communications are handled exclusively by the voice processor 26 as represented by the solid lines connecting the voice processor 30 and the BTS 14, via the switch 30. At such time as the mobile unit 36 traverses from the cell 18 to the cell 20 (a determination that is typically made by both the MSC 23 and the mobile unit 36), a handoff takes place. During a handoff, the switch 30 associated with the voice processor 26 is controlled by the CPU 34 to disconnect the voice processor 26 from the BTS 14 and to connect the voice processor 26 to the BTS 16 in both the inbound and outbound directions, such a connection is represented by the dashed lines in FIG. 1. In addition to the switching in the BSC 22, the mobile unit 36 switches from a frequency or code corresponding to the cell 18 to a frequency or code corresponding to the cell 20.

Ideally, the switch 30 disconnects from the BTS 14 and connects to the BTS 16 at the exact time the mobile unit 36 switches from the cell 18 to the cell 20 because the voice processor 26 can only process one audio source (e.g., one BTS 14 or 16) at a time. However, in reality this switching is not synchronous. Accordingly, for the communication network 10 shown in FIG. 1, audio will be interrupted by an audio mute. The mute occurs in both the outbound path (i.e., the path from the MSC 23 to the mobile unit 36) and the inbound path (i.e., the path from the mobile unit 36 to the MSC 23). The duration of the mute is the length of time between when the switch 30 switches and when the mobile unit 36 switches.

A known communication network 60 that eliminates an outbound audio mute during a handoff is shown in FIG. 2. Like the communication network 10 shown in FIG. 1, the communication network 60 includes a number of BTS's (only two of which are shown) 64, 66, each of which provides a cell of coverage 68, 70, respectively. Each BTS 64, 66 is selectively interfaced to a BSC 74, and each BSC 74 typically provides communication service to one or more BTS's 64, 66. The BSC 74 typically includes one or more voice processors 76, 78, switches 80, 82 and a central processing unit (CPU) 84. The voice processors 76, 78 process communication information that is sent to and received from a mobile unit 86. The voice processors 76, 78 are selectively interfaced to an MSC 90, via the switches 80, 82. The MSC 90 provides an interface between the BSC 74 and a PSTN 94. The CPU 84 is provided to control the switches 80, 82.

While the mobile unit 86 is within the cell 68, communications are handled by the voice processor 76, as represented by the solid lines connecting the voice processor 76, the switch 80 and the BTS 64. The outbound connection between the voice processor 76 and the BTS 64 is coupled through the switch 80, which is adapted to selectively connect to either or both of the BTS's 64, 66. As the mobile unit 86 traverses near the cell 70 (as shown in FIG. 2) the MSC 90 determines that a handoff is likely to occur and the CPU 84 controls the switch 80 to establish a link from the voice processor 76 to the BTS 66. Such a situation is shown by the dashed line from the switch 80 to the BTS 66 in FIG. 2. Such a link provides outbound audio to the cell 70 before the mobile unit 86 reaches that cell. Thus, when the mobile unit 86 reaches the cell 70, outbound audio will already be present at the cell 70. Such a configuration eliminates any outbound audio mute.

The configuration shown in FIG. 2 does not, however, eliminate an inbound audio mute caused by the fact that the switch 80 does not switch its inbound connection from the BTS 64 to the BTS 66 until the handoff actually occurs. When the mobile unit 86 is in the cell 68, the connection from the BTS 64 to the switch 80 is in use, as represented by the solid line from the BTS 64 to the switch 80.

When the mobile unit 86 moves into the cell 70, communication is established from the BTS 66 to the switch 80 and the voice processor 76, as represented by the dashed line from the BTS 66 to the switch 80 and the voice processor 76. Additionally, the connection from the BTS 64 to the voice processor 76 may be broken or "torn down." The voice processor 76 is only connected to either the BTS 64 or the BTS 66 because the voice processor 76 can only process one inbound signal at a time (e.g., either the signal from the BTS 64 or the signal from the BTS 66). The mobile unit 86 does not switch from the frequency or code associated with the cell 68 to the frequency or code associated with the cell 70 until a handoff takes place. As with the communication network 10 of FIG. 1, ideally when a handoff takes place, the switch 80 disconnects its inbound path from the BTS 64 and connects its inbound path to the BTS 66 at exactly the same time the mobile unit 86 switches. However, in reality this is rarely possible and, therefore, an inbound audio mute having a duration equal to the difference in switching times between the switch 80 and the mobile unit 86 results.

Therefore, there is a need for a method and an apparatus for reducing audio gaps during a handoff in a communication network.

DETAILED DESCRIPTION OF THE PREFERRED EMBODIMENTS

In general, the teachings of the present invention pertain to the reduction or elimination of inbound and outbound audio mutes that occur during a handoff in a communication network. Although the communication network disclosed herein is associated with a cellular system, those having ordinary skill in the art will readily appreciate that the teachings of the present invention may be applied to any communication networks that utilize handoffs. Such communication networks may include terrestrial networks, personal communication networks and the like.

Figure 1:
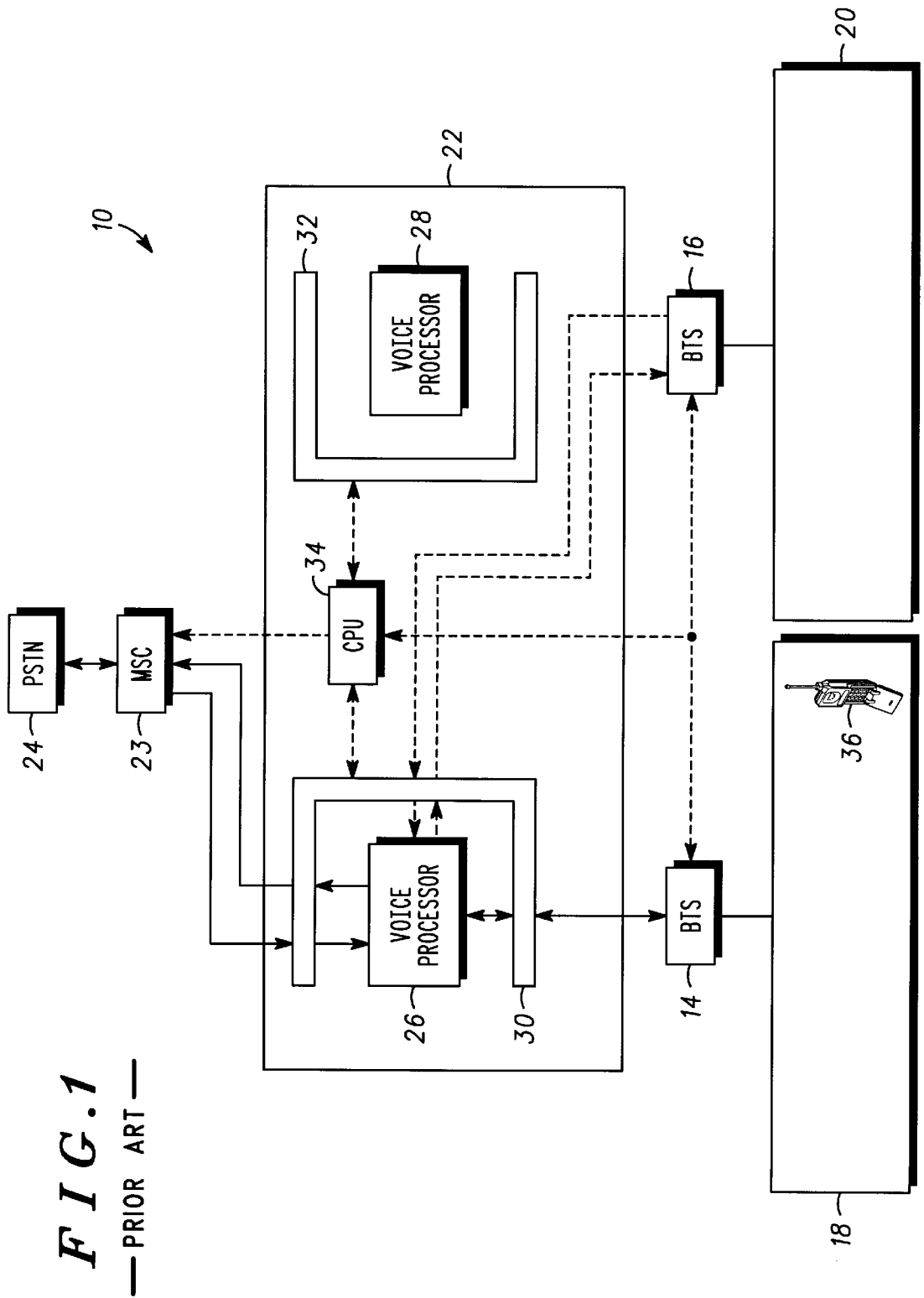
FIG. 1 is a block diagram illustrating a known communication network having both an inbound audio mute and an outbound audio mute during a handoff.
Figure 2:
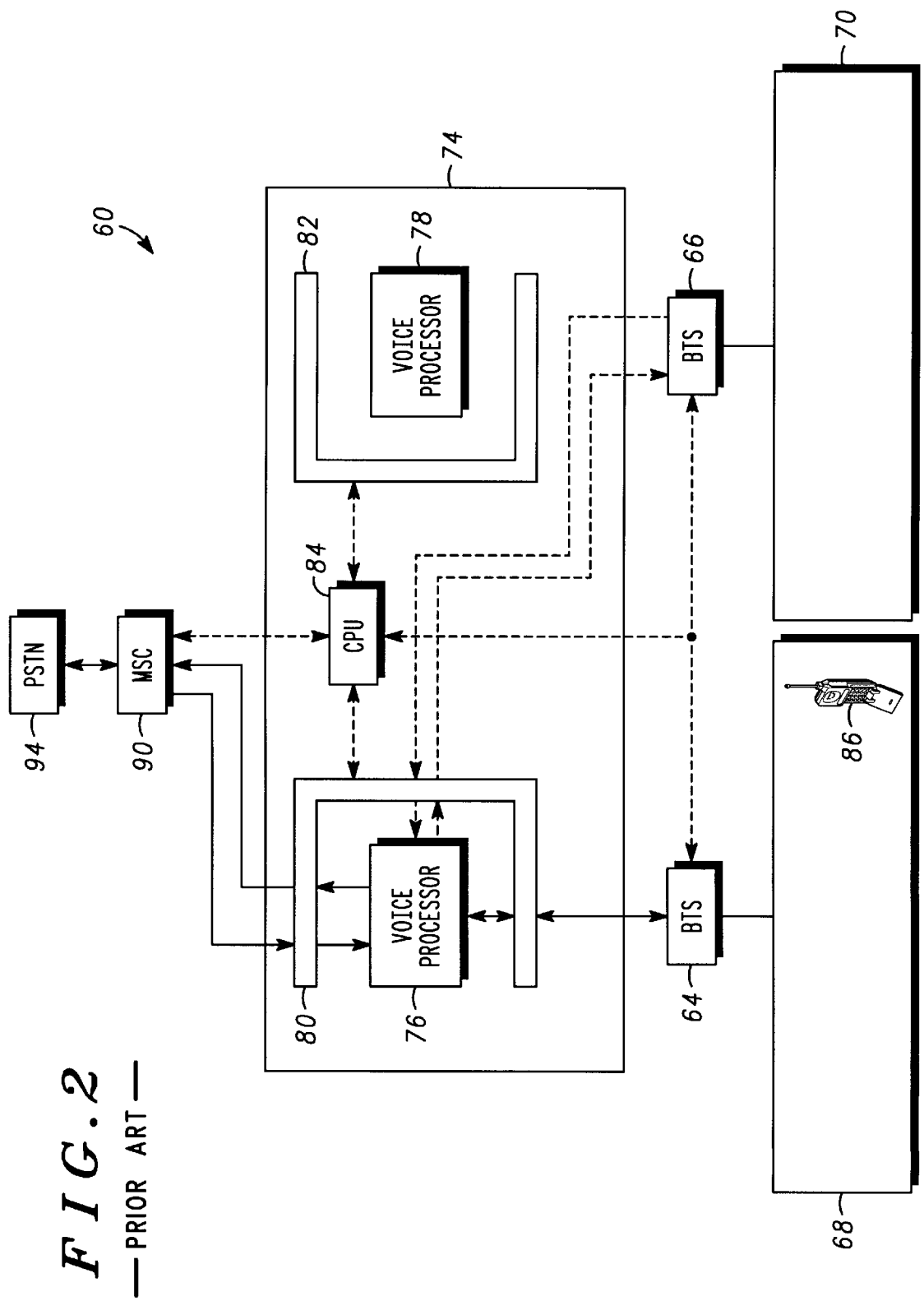
FIG. 2 is a block diagram illustrating a known communication network having only an inbound audio mute during a handoff.
Figure 3:
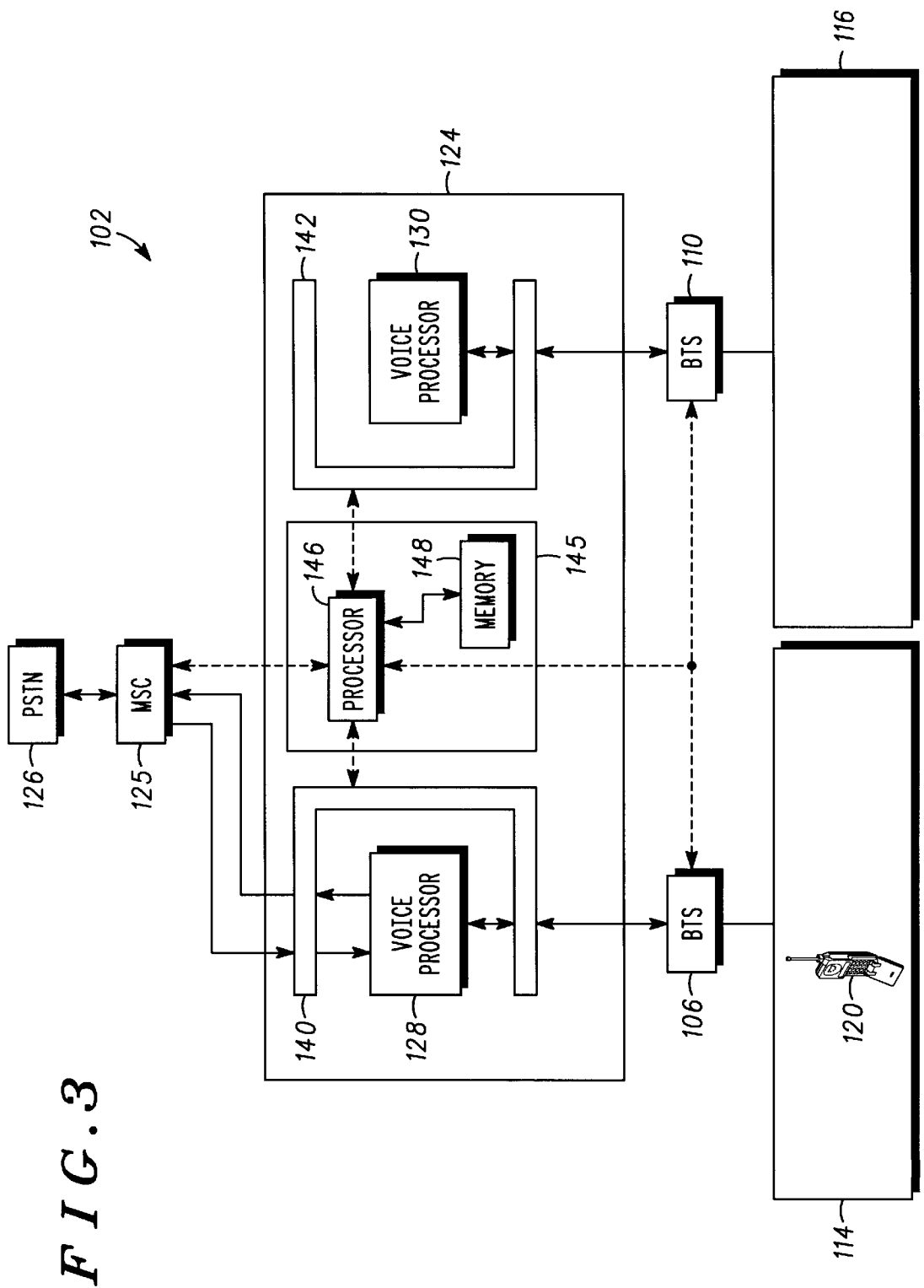
FIGS. 3 is a block diagram illustrating a communication network designed in accordance with the teachings of the present invention.

Referring now to FIG. 3, a communication network 102 generally includes a plurality of BTS's, only two of which are shown in FIG. 3 as 106 and 110. The BTS's 106, 110 generate coverage cells 114, 116, respectively. A mobile unit 120 is shown inside the cell 114. Each of the BTS's 106, 110 are connected to a BSC 124. The BSC 124 is communicatively coupled to an MSC 125, which is further coupled to a PSTN 126. The MSC 124 may include voice processors 128, 130, communication switches 140, 142 and a central processing unit (CPU) 145. The CPU 145 may include a processor 146 and a memory 148.

In general, the voice processor 128 provides communication service between the mobile unit 120 in the cell 114 and the PSTN 126, via the MSC 125 and the switch 140. Similarly, the voice processor 130 provides communication service between the cell 116 and the PSTN 126. However, because there are no mobile units within the cell 116, the voice processor 130 need not be connected to the MSC 125, as there is no audio to be exchanged between the cell 116 to the PSTN 126. The voice processor 128 performs the function of compressing data that is to be transmitted to the mobile unit 120 via the BTS 106. Additionally, the voice processor 128 performs the function of decompressing data received from the mobile unit 120, via the BTS 106, and couples the decompressed data to the PSTN 126, via the switch 140 and the MSC 125. Similarly, the voice processor 130 performs the functions of compressing and decompressing data that is exchanged between the MSC 125 and the BTS 110, which provides the coverage cell 116.

The switches 140, 142 may be embodied in kiloport switches that are known to those having ordinary skill in the art and that are capable of establishing and tearing down communication paths. The switches 140, 142 are controlled by the CPU 145 to communicatively couple the voice processors 128, 130, respectively, to the MSC 125. For example, the switches 140, 142 may be controlled by the CPU 145 to establish or tear down communication paths between one another, between the voice processors 128, 130 and the BTS's 106, 110 or between the voice processors 128, 130 and the MSC 125. As a further example, the switch 140 may couple information from the MSC 125 to the voice processor 128, and the switch 142 may couple information from the MSC 125 to the voice processor 130.

The CPU 145, which may include the processor 146 and the memory 148, may be communicatively coupled to the MSC 125 and the BTS's 106, 110. The CPU 145 is also coupled to, and programmed to control, the switches 140, 142. In particular, either the processor 146 or the memory 148 of the CPU 145 may be programmed with software that controls the switches 140, 142 to establish and tear down communication paths between the switches 140, 142 themselves, the voice processors 128, 130, the MSC 125 and the BTS's 106, 110. Further information regarding the software or programming of the CPU 145 to carry out various aspects of the present invention will be described below with respect to FIG. 4.

When the mobile unit 120 is well within the cell 114, the various components of the communication network 102 are connected as shown in FIG. 3. However, when the mobile unit 120 nears the edge of the cell 114 that abuts the cell 116 (as shown in FIG. 5), the MSC 125 of the communication network 102 detects that a handoff is likely to occur between the cell 114 (which may be referred to as the source cell) and the cell 116 (which may be referred to as the target cell). As will be appreciated by those having ordinary skill in the art, a cell and associated hardware from which a mobile unit is switching (or "handing off") is commonly referred to using the adjective "source." Likewise, it will be appreciated that a cell and associated hardware to which a mobile unit is switching is commonly referred to by the adjective "target." For example, a mobile unit switches from a source cell to a target cell. When the MSC 125 determines that a handoff is likely to occur, the MSC 125 informs the CPU 145, which performs the various steps shown in FIG. 4 and described in connection with FIGS. 5 and 6.

Figure 4:
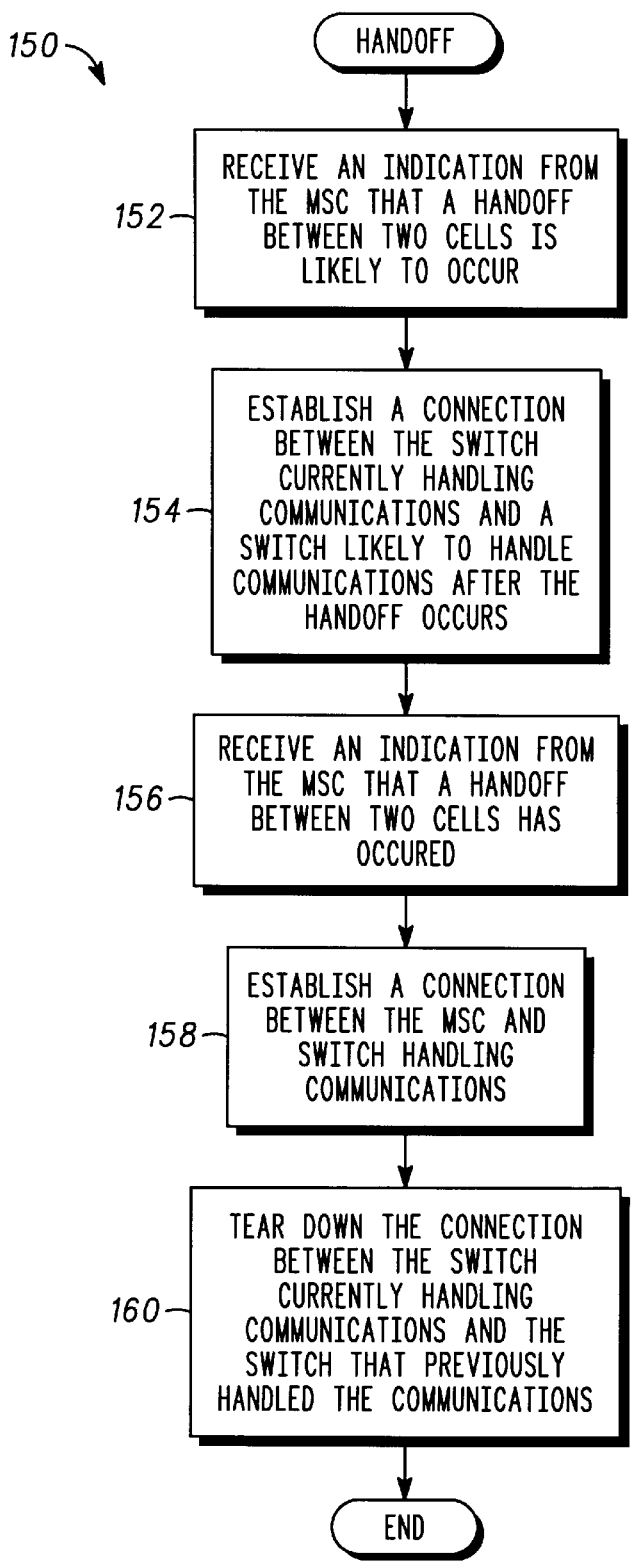
FIG. 4 is a flow diagram illustrating the process by which the communication handoff illustrated in FIGS. 3, 5 and 6 is carried out.
Figure 5:
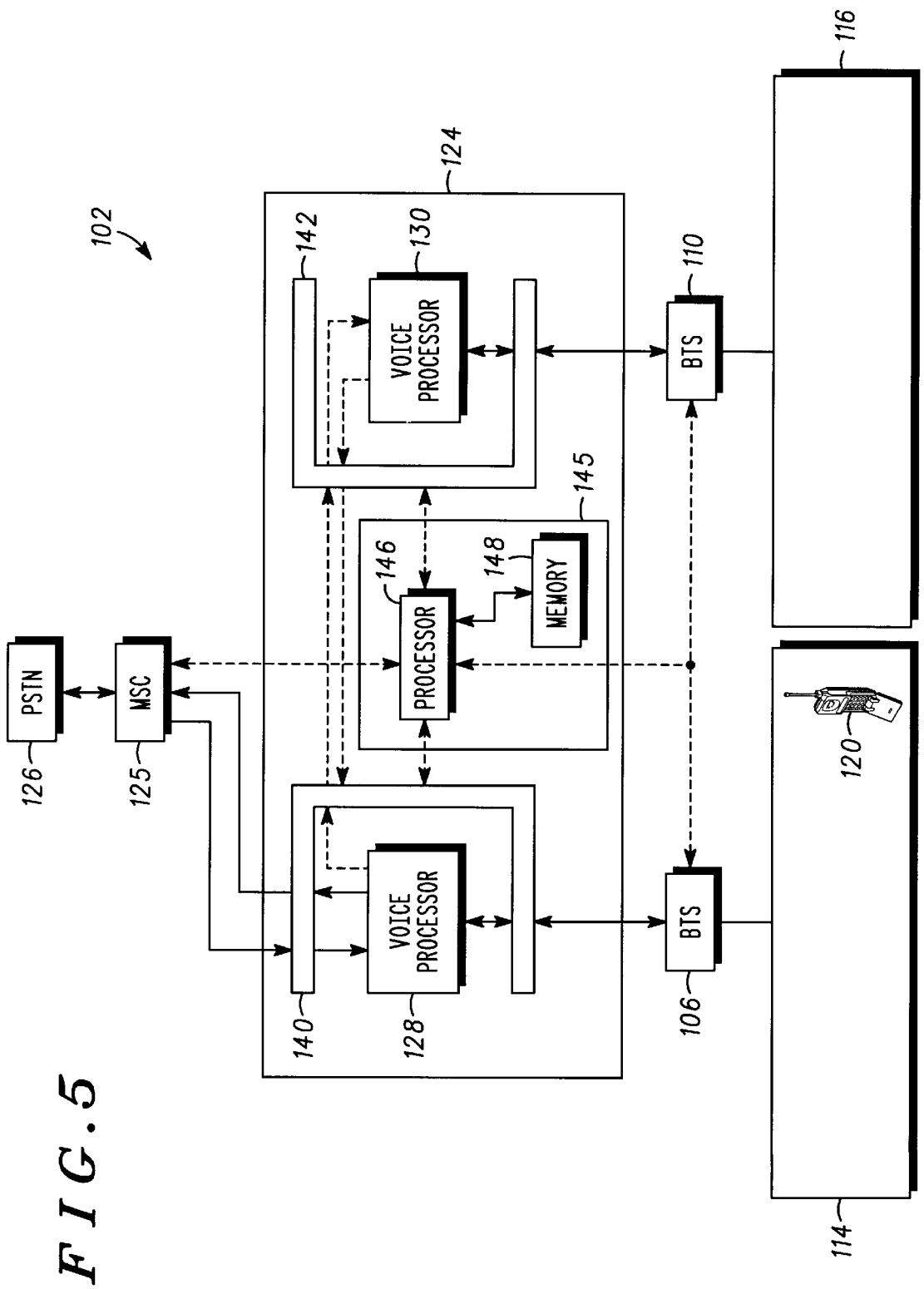
FIGS. 5 and 6 are block diagrams illustrating a communication handoff carried out on a communication network designed in accordance with the teachings of the present invention.

FIG. 4 illustrates a handoff process 150 that includes a number of steps that the CPU 145 performs to complete a handoff. The handoff process 150 may be programmed as software or instructions adapted to be executed by the processor 146. The software or instructions may be stored in the memory 148, which may be a read only memory (ROM), random access memory (RAM) or any suitable combination thereof. In particular, at step 152 the CPU 145 receives an indication from the MSC 125 that a handoff between two cells (e.g., cells 114 and 116) is likely to occur. The MSC 125 may indicate that a handoff is likely to occur when, for example, the mobile unit 120 is close to the boundary between two cells, such a situation is shown in FIG. 5.

After the CPU 145 receives from the MSC 125 an indication that a handoff is likely to occur, the CPU 145, at step 154, controls the switches 140, 142 to establish inbound and outbound connections between the switch currently handling communications (e.g., switch 140) and a switch likely to handle communications after the handoff occurs (e.g., switch 142). Such connections are represented by the dashed lines between switch 140 and switch 142 in FIG. 5. In particular, the CPU 145 controls the switch 140 to couple information from the MSC 125 to both of the voice processor 128 and the switch 142. The switch 142, in turn, couples information to the voice processor 130, which communicates with the BTS 110. Thus, outbound audio is coupled from the MSC 125 to each of the cells 114, 116 before the mobile unit 120 switches over to communicate with the cell 116, thereby eliminating any outbound audio mute.

Regarding the inbound audio path, when a handoff between cells 114 and 116 is anticipated by the MSC 125, the CPU 145 controls the switches so that the BTS 110 couples information to the switch 142, which further couples the information to the voice processor 130 for processing. After the inbound audio information from the cell 116 has been processed (e.g., decompressed) by the voice processor 130, the information is coupled to the switch 140, via the switch 142. Thus, inbound audio from cells 114, 116 is coupled to the MSC 125, thereby eliminating any inbound audio mute.

In the inbound path, the audio from the cell 116 is coupled from the BTS 110 to the MSC 125 via the switch 142, the voice processor 130 and the switch 140. The switch 140 adds the information from the voice processor 128 to the information from the voice processor 130 (provided by the switch 142) and provides the combined information to the MSC 125. This addition is possible because the BTS (e.g., 106 or 110) associated with the cell with which the mobile unit 120 is communicating is the only BTS (e.g., 106 or 110) providing audio to the switch 140. Furthermore, this addition is typically performed by the switch 140 because the voice processor 128 may not be able to handle more than one audio signal source (i.e., audio signals from more than one BTS). The BTS that is not handling communication with the mobile unit 120 provides no audio to the switch 140. Therefore, the sum of the audio from the BTS handling communication with mobile unit 120 and the BTS not handling communication with the mobile unit 120 is merely the audio from the BTS handling the communication with the mobile unit 120.

Returning to FIG. 4, when the MSC 125 determines that a handoff between the two cells (e.g., 114, 116) has occurred and in complete, the MSC 125 communicates such a determination to the CPU 145, which receives the indication from the MSC 125 at step 156 of the handoff process 150. Upon receiving an indication that a handoff has occurred, the CPU 145, at step 158, controls the switches 140, 142 to establish inbound and outbound connections between the MSC 125 and the switch 142 associated with the voice processor 130 handling communications with the mobile unit 120 (shown as the dashed lines in FIG. 6). After step 158 has completed the CPU 145, at step 160, controls the switches 140, 142 to tear down the connection between the switch currently handling communications (e.g., switch 142) and the switch that was previously handling communications (e.g., switch 140). Thus, inbound and outbound communications are provided between the cell 116 and the MSC 125 without the use of the switch 140 or the voice processor 128.

Figure 6:
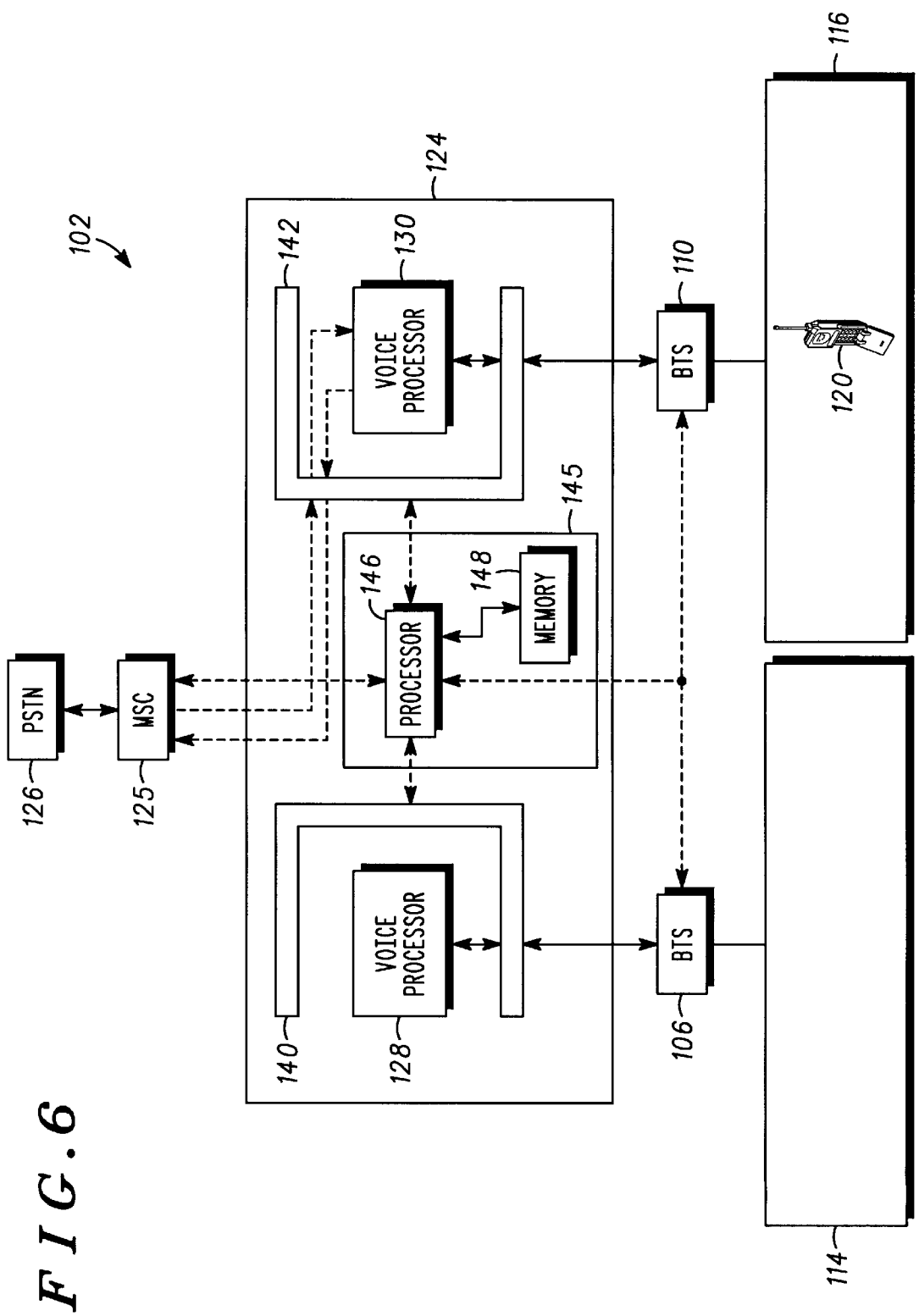

FIG. 6 represents the state of the communication network 102 after a handoff to cell 116 has taken place (e.g., after step 160 of FIG. 4 has been executed) and when a handoff from cell 116 to any other cell is not anticipated. As shown in FIG. 6, after the handoff between cell 114 and cell 116 is carried out, all connections between the mobile switches 140, 142 are torn down by the CPU 145. The operation of the communication network 102 as shown in FIG. 6 is substantially identical to the operation of the communication network 102 as shown in FIG. 3, except that communications between the mobile unit 120 and the MSC 125 are exclusively handled by the BTS 110, the voice processor 130 and the switch 142.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method of reducing an audio gap in a signal connection between a communication network and a mobile unit during a handoff between a source call and a target cell in the communication network, wherein the communication network includes a mobile switching center communicatively coupled to a source base station that services the source cell, via a source switch and a source voice processor, the communication network further including a target switch, a target voice processor and a target base station that services the target cell, the method comprising the steps of:

determining that the mobile unit is likely to move from the source cell to the target cell;

establishing an inbound signal path from the target base station to the mobile switching center, via the target switch, the target voice processor and the source switch;

establishing an outbound signal path from the mobile switching center to the target base station, via the source switch, the source voice processor and the target switch;

determining that the mobile unit has moved from the source cell to the target cell; and establishing inbound and outbound signal paths between the target switch and the mobile switching center after the mobile unit has moved from the source cell to the target cell.

2. The method of claim 1, further comprising the step of eliminating the inbound and outbound signal paths between the target switch and the source switch after the mobile unit has moved from the source cell to the target cell.

3. The method of claim 1 further comprising the steps of eliminating the communicative coupling between the mobile switching center and the source switch after the mobile unit has moved from the source cell to the target cell.

4. The method of claim 1, further comprising the step of eliminating the communicative coupling between the mobile switching center and the source base station.

5. The method of claim 1, wherein the step of determining that the mobile unit has moved from the source cell to the target cell is performed by the mobile switching center.

6. The method of claim 1, wherein the step of determining that the mobile unit is likely to move from the source cell to the target cell is performed by the mobile switching center.

7. A communication network adapted to reduce an audio gap in a connection between the communication network and a mobile unit during a handoff between a source cell and a target cell in the communication network, the communication network comprising:

a source base station that services the source cell;

a source voice processor;

a source switch;

a mobile switching center adapted to be communicatively coupled to the source base station via the source switch and the source voice processor, the mobile switching center being adapted to generate an indication that the mobile unit is likely to move from the source cell to the target cell;

a target base station that services the target cell;

a target voice processor;

a target switch; and a processing unit communicatively coupled to the mobile switching center, the source switch and the target switch, the processing unit programmed to:

receive the indication from the mobile switching center that the mobile unit is likely to move from the source cell to the target cell;

control the source switch and the target switch to establish an inbound signal path from the target base station to the mobile switching center, via the target switch, the target voice processor and the source switch; and control the source switch and the target switch to establish an outbound signal path from the mobile switching center to the target base station, via the source switch, the source voice processor and the target switch.

8. The communication network of claim 7, wherein the mobile switching is further adapted to generate an indication that the mobile unit has moved from the source cell to the target cell.

9. The communication network of claim 8, wherein the processing unit is further programmed to receive from the mobile switching center the indication that the mobile unit has moved from the source cell to the target cell.

10. The communication network of claim 9, wherein the processing unit is further programmed to control the source switch and the target switch to establish inbound and outbound communication paths between the target switch and the mobile switching center after the mobile unit has moved from the source cell to the target cell.

11. The communication network of claim 10, wherein the processing unit is further programmed to control the source switch and the target switch to eliminate a portion of the inbound and outbound signal paths between target switch and the source switch after the mobile unit has moved from the source cell to the target cell.

12. The communication network of claim 10, wherein the processing unit is further programmed to control the source switch and the target switch to eliminate the communicative coupling between the mobile switching center and the source switch after the mobile unit has moved from the source cell to the target cell.

13. The communication network of claim 10, wherein the processing unit is further programmed to eliminate the communicative coupling between the mobile switching center and the source base station.

14. A processing unit for use in a communication network adapted to reduce an audio gap in a connection between the communication network and a mobile unit during a handoff between a source cell and a target cell in the communication network, the communication network including a source base station that services the source cell, a source voice processor adapted to process signals associated with the source cell that services the target cell, a target base station that services the target cell, a target voice processor adapted to process signals associated with the target cell, a mobile switching center communicatively coupled with a public telephone network, the mobile switching center capable of generating an indication that a handoff between the source cell and the target cell is likely to occur, the mobile switching center adapted to be communicatively coupled to the source base station via a source switch and the source voice processor adapted to be communicatively coupled to the target base station via a target switch and the target voice processor, the processing unit comprising:

a first portion of software adapted to receive from the mobile switching center the indication that a handoff between the source cell and the target cell is likely to occur;

a second portion of software adapted to control the source switch and the target switch to establish an inbound signal path from the target base station to the mobile switching center, via the target switch, the target voice processor and the source switch; and a third portion of software adapted to control the source switch and the target switch to establish an outbound signal path from the mobile switching center to the target base station, via the source switch, the source voice processor and the target switch.

15. The processing unit of claim 14, wherein the mobile switching center is capable of generating an indication that a handoff between the source cell and the target cell has occurred, and wherein the processing unit further comprises a fourth portion of software adapted to receive from the mobile switching center the indication that a handoff between the source cell and the target cell has occurred.

16. The processing unit of claim 15, further comprising a fifth portion of software adapted to control the source switch and the target switch to establish inbound and outbound communication paths between the target switch and the mobile switching center after the mobile unit has moved from the source cell to the target cell.

17. The processing unit of claim 16, wherein the processing unit is further programmed to control the source switch and the target switch to eliminate a portion of the inbound and outbound signal paths between the target switch and the source switch.

18. The processing unit of claim 16, wherein the processing unit is further programmed to control the source switch and the target switch to eliminate the communicative coupling between the mobile switching center and the source switch after the mobile unit has moved from the source cell to the target cell.

* * * * *